United States Patent
Akahira (10) Patent No.: US 6,277,515 B1
(45) Date of Patent: Aug. 21, 2001

(54) SOLID ELECTROLYTE BATTERY WITH CHARGE ACCUMULATING PORTIONS SURROUNDING A BATTERY STRUCTURE PORTION

(75) Inventor: Sachio Akahira, Miyagi (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/310,128

(22) Filed: May 12, 1999

(30) Foreign Application Priority Data

May 14, 1998 (JP) .................................................. 10-132303

(51) Int. Cl.[7] .................................................. H01M 10/04
(52) U.S. Cl. .......................... 429/152; 429/123; 429/141; 429/142
(58) Field of Search .................................... 429/152, 213, 429/304, 123, 141, 142

(56) References Cited

U.S. PATENT DOCUMENTS 4,948,685 * 8/1990 Ohsawa ................................. 429/213
5,290,644 * 3/1994 Andrieu ................................ 429/129
5,498,489 * 3/1996 Dasgupta .............................. 424/152
5,693,105 * 12/1997 Kawakami ........................... 29/623.2

* cited by examiner

*Primary Examiner*—Stephen Kalafut
*Assistant Examiner*—Mark Ruthkosky
(74) *Attorney, Agent, or Firm*—Sonnenschein, Nath & Rosenthal (57) ABSTRACT

A solid electrolyte battery is provided which is able to satisfactorily perform discharge of a large electric current in a short time and large electric current pulse even in a low temperature environment. A solid electrolyte battery incorporates: a battery structure portion constituted by forming a positive-electrode active-material layer in a portion of the surface of a positive-electrode collector and a negative-electrode active-material layer in a portion of the surface of a negative-electrode collector to be opposite to each other through a polymer electrolyte. The solid electrolyte battery incorporates a first charge-accumulating portion constituted by disposing, through a dielectric-material layer, the positive-electrode collector to be opposite to a portion of the negative-electrode collector in which the negative-electrode active-material layer is formed; and a second charge-accumulating portion constituted by disposing, through a dielectric layer, the negative-electrode collector to be opposite to a portion of the positive-electrode collector in which the positive-electrode active-material layer is formed.

20 Claims, 6 Drawing Sheets

SOLID ELECTROLYTE BATTERY WITH CHARGE ACCUMULATING PORTIONS SURROUNDING A BATTERY STRUCTURE PORTION

BACKGROUND OF THE INVENTION

1. Field of the Invention

The present invention relates to a solid electrolyte battery having excellent heavy load resistance, pulse discharge load resistance and over discharge resistance.

2. Description of the Related Art

Since a variety of electronic apparatuses have dramatically progressed, research and development of secondary battery have been carried out. The reason for this lies in that the secondary battery can continuously be used for a long time and the same can again be charged to serve as an economical power source. The representative secondary batteries are exemplified by a non-aqueous electrolyte secondary battery, such as a lithium ion battery, and an all-solid electrolyte polymer battery. The all-solid electrolyte polymer battery incorporates all-solid polymer electrolyte containing a cation conductive materials, such as polyether oxide, polyester, polyimide, crosslinked polyether or polyether derivatives.

In particularly, the all-solid electrolyte polymer battery incorporates a heating-permissible electrolyte. Since the foregoing electrolyte is embedded in high polymer chains of the polymers, frame resistance and a self-extinguishing characteristic can be imparted. As compared with the non-aqueous electrolyte secondary battery, the all-solid electrolyte polymer battery has significant safety characteristics to resist disturbance, such as an external shock, unintentional overcharge and unintentional leaving in a hot atmosphere. As described above, the all-solid electrolyte polymer battery has satisfactory safety.

The all-solid electrolyte polymer battery suffers from a problem in that a poor ion conductivity $\sigma$ of $10^{-4}$ S (siemens)/cm to $10^{-5}$ S/cm in the vicinity of room temperature. As described above, the polymer battery incorporates the all-solid electrolyte polymer battery having superior safety to that of the non-aqueous electrolyte secondary battery. Moreover, the polymer battery contains the electrolyte which is the non-aqueous electrolyte having the poor ion conductivity embedded in the polymers. Therefore, there arises a problem in that an output of an electric current which can be obtained per unit hour is excessively small as compared with that of the non-aqueous electrolyte secondary battery. As a result, there arises a problem in that use of the all-solid electrolyte polymer battery is limited.

Therefore, a polymer battery having an ion conductivity of $10^{-3}$ S/cm or greater which is a practical value from the viewpoint of industrial use has been obtained and investigated. Note that all-solid electrolytes have been reported which exhibit a high ion conductivity of $10^{-3}$ S/cm at high temperatures in the vicinity of 100° C. which is a level required from the viewpoint of practical use. However, the above-mentioned high temperature condition is not a condition under which the battery is frequently used from a viewpoint of the practical use. Therefore, simplicity and the shape of the polymer battery are limited in the field of use of the polymer battery.

An attempt to improve the ion conductivity of the all-solid electrolyte polymer battery has been made by raising the concentration of salt in the polymer electrolyte. However, the above-mentioned method cannot improve the ion conductivity. The reason for this lies in that rise in the concentration of salt in the polymer electrolyte enhances crystallization of the polymers. As a result, the ratio of ions which can freely be moved in the polymer electrolyte cannot be raised.

Another method has been investigated in which the concentration of salt in the polymer electrolyte is raised and a crystallization inhibitor, such as isocyanate, is mixed with the polymer. The above-mentioned method, however, causes isocyanate to react with cation. What is worse, introduction of active protons results in the severer conditions being required. Therefore, the foregoing method is not an effective method.

Another method has been investigated which improves the ion conductivity of the all-solid electrolyte polymer battery. The method uses molten salt to raise the density of carriers. Although lithium double salt has solubility, the double salt can easily be exploded. Therefore, safety cannot easily be realized.

Another means has been disclosed in which side-chain molecular structures provided for main chains of the polymers have the ion conductivity in place of the main chains of the molecular structures arranged in the polymers to form a mesh configuration. If the foregoing method is employed, a required ion conductivity cannot be obtained. However, a poor ion conductivity at room temperature is realized which is about $10^{-4}$ S/cm which is lower than a practical value by one digit.

As a practical means for achieving an ion conductivity $\sigma$ of $10^{-3}$ S/cm, a composite electrolyte has been disclosed which has the ion conductivity by impregnating a porous film made of polypropylene or polyvinylidene fluoride with organic solvent, such as polycarbonate, ethylene carbonate or $\gamma$-butyllactone. As a matter of course, the foregoing porous film, however, has unsatisfactory mechanical strength. As a result, short circuit easily occurs when external force is exerted. In particular, the polymer electrolyte cannot resist dendrite short circuit, causing the organic solvent with which the porous film has been impregnated to easily be exudated. Therefore, a battery manufactured by the above-mentioned method cannot be included in the category of the polymer electrolyte battery.

As another composite electrolyte, a method has been disclosed which uses a high polymer gel film in which non-proton organic solvent is confined in small spaces in a 3D network structure of crosslinked high polymer molecules.

The electrolyte containing the high polymer gel film has required mechanical strength as compared with that of the all-solid electrolyte. Moreover, an ion conductivity of an order of $10^{-3}$ S/cm can be obtained. Therefore, the foregoing method is considered to be a most practical solving means.

As compared with the conventional non-aqueous electrolyte secondary battery, such as the lithium ion battery, the polymer battery incorporating the high polymer gel film does not require a pressure-resisting container because organic solvent is confined in the gel form polymer. Moreover, a weight energy density and a volume energy density can be obtained which are realized when the foregoing battery has been formed into a battery pack and which are similar to or superior to those of the conventional non-aqueous electrolyte secondary battery. The polymer battery incorporating, the high polymer gel film is able to maintain the shape thereof with thin structures of electrodes. Therefore, the foregoing polymer battery has a possibility that a very thin battery cell can be manufactured. Therefore, there has been expected to apply the foregoing polymer batteries to notebook personal computers and very-thin portable apparatuses. Similar to the all-solid electrolyte polymer battery, the polymer battery incorporating the high polymer gel film contains the high polymer chains of the polymers which are impregnated with the electrolyte. Therefore, frame resistance and a self-extinguishing characteristic can be imparted, causing, satisfactory safety to be realized.

As described above, the polymer battery incorporating, the high polymer gel film has the ion conductivity of the electrolyte, which is $10^{-3}$ S/cm, similar to that of the electrolyte of the non-aqueous electrolyte secondary battery. However, the foregoing polymer battery suffers from low reaction speed in the interface between the electrolyte and the active materials as compared with the non-aqueous electrolyte secondary battery. Therefore, an output of electric currents which can be obtained per unit hour is inferior to that of the non-aqueous electrolyte secondary battery.

As compared with other secondary batteries including a Ni—Cd secondary battery and a Ni—MH secondary battery, the all-solid electrolyte polymer battery and the polymer battery incorporating the high polymer gel film have poor discharging characteristic when a large current is discharged. In actual, the polymer battery incorporating the high polymer gel film has a double electric layer having a relatively large capacitance and formed in the interface between the active materials and the electrolyte owning to polarization of the electrolyte. Although electric charges accumulated in the double electric layer are first discharged when instantaneous discharge in a certain quantity is required. The amount of the electric charges is smaller than a required amount.

When the all-solid electrolyte polymer battery or the polymer battery incorporating the high polymer gel film is employed as a power source for an automobile or a power surface for another industrial field, there arises the following problem. That is, each of the foregoing batteries cannot satisfactorily be applied to a case in which discharge of a large electric current is instantaneously required when the operation of the apparatus is started or the operation speed is accelerated.

Specifically, when the all-solid electrolyte polymer battery or the polymer battery incorporating the high polymer gel film is employed as the power source for an automobile, a large electric current, which is several times the electric currents required to perform a usual operation, is required to start or accelerate the automobile. When the polymer battery is employed as the power source for an automobile, a period of time required to start or accelerate the automobile is a short time with respect to the overall period of time for which the automobile is driven. A considerably large electric current is required in the foregoing short period of time. Therefore, a battery cell must be provided which has a capacitance which is several times a capacitance required to perform a usual operation. As an alternative to this, a capacitor having a large capacitance must be provided in addition to the battery Moreover, an operation for performing control to switch the power source on the circuit must be performed to supply the large electric current in the short period of time in which the start or the acceleration is performed.

A state will now be considered in which the all-solid electrolyte polymer battery or the polymer battery incorporating the high polymer gel film is employed as the power source for a portable telephone. In the foregoing case, a satisfactory load characteristic which is able to resist discharge of large electric currents of several meter seconds to some hundreds meter seconds, that is, so-called pulse discharge, is required. However, a polymer battery having a satisfactory load characteristic to resist the pulse discharge has not been realized as yet.

The solid electrolyte polymer battery or the polymer battery incorporating the high polymer gel film has the ion conductivity of the electrolyte which easily depends on the temperature. Therefore, there arises a problem in that the ion conductivity deteriorates at low temperatures and thus the load characteristic deteriorates. That is, the electrolyte of the polymer battery suffers from a problem in that the ion conductivity excessively depends on the temperature.

When the temperature has been lowered, the ion conductivity of the all-solid electrolyte polymer battery excessively deteriorates as compared with that indicated with the Arrhenius equation of a solution-type electrolyte. In particular, the ion conductivity rapidly deteriorates at temperatures lower than temperatures in the vicinity of point Tg which is a glass transition point. For example, ion conductivity σ of polyether oxide at 0° C. or lower is $10^{-6}$ S/cm to $10^{-8}$ S/cm which are similar to those of an insulating material.

When the foregoing battery is mounted on an automobile, an industrial apparatus or a portable telephone, deterioration in the load characteristic at low temperatures, for example, −20° C. or lower must be overcome to practically use the battery.

SUMMARY OF THE INVENTION

In view of the foregoing, the present invention work towards providing a solid electrolyte battery which is capable of discharge large electric currents and discharge large electric current pulses in a short time if the temperature is low.

To achieve the above-mentioned object, according to the present invention, there is provided a solid electrolyte battery comprising: a battery structure portion constituted by disposing a positive-electrode active-material layer formed in a portion of the surface of a positive-electrode collector and a negative-electrode active-material layer formed in a portion of the surface of a negative-electrode collector to be opposite to each other through a polymer electrolyte; a first charge-accumulating portion constituted by disposing, through a separating layer, the positive-electrode collector to be opposite to a portion of the negative-electrode collector in which the negative-electrode active-material layer is formed; and a second charge-accumulating portion constituted by disposing, through a separating layer, the negative-electrode collector to be opposite to a portion of the positive-electrode collector in which the positive-electrode active-material layer is formed. It is preferable that the separating layers are dielectric layers or double electric layers.

In the solid electrolyte battery according to the present invention and having the above-mentioned structure, charges are accumulated in both of the battery structure portion and the charge accumulating portion. Therefore, a battery having a large capacity can be realized so that the battery according to the present invention is able to cope with an instantaneous load of a large electric current.

In the solid electrolyte battery according to the present invention, charges accumulated in the charge accumulating portion imparts, to an ion atmosphere, an electric field with which the ion atmosphere in polymers in the battery structure portion can easily be moved in the same direction as the ion movement direction occurring when discharge is performed. As a result, the moving speed of the ions is accelerated so that ion conductivity is improved. Therefore, the solid electrolyte battery according to the present invention is able to significantly improve a load characteristic against discharge of a large electric current.

DESCRIPTION OF THE PREFERRED EMBODIMENTS

Figure 1:
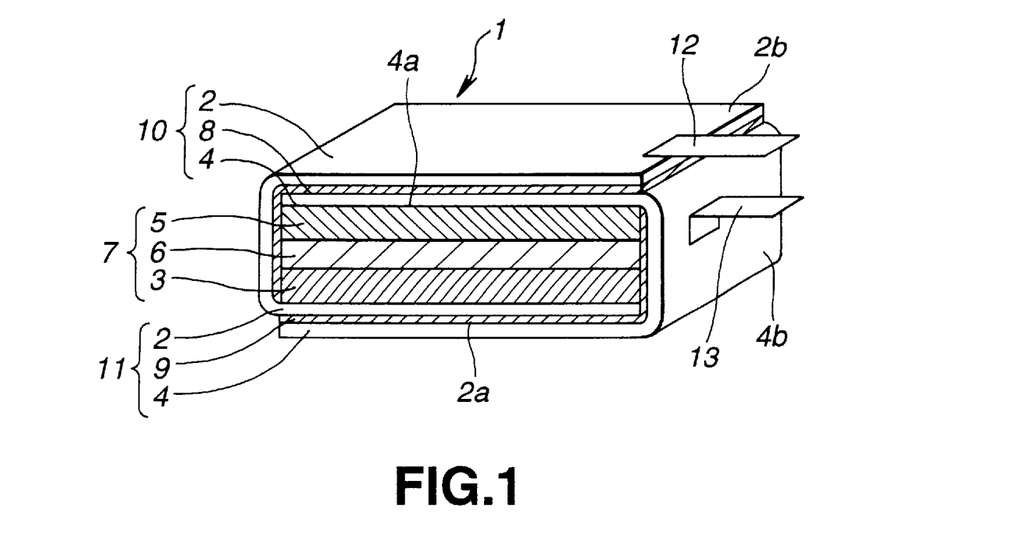
FIG. 1 is a perspective view showing an example of a solid electrolyte battery according to the present invention.
Figure 2:
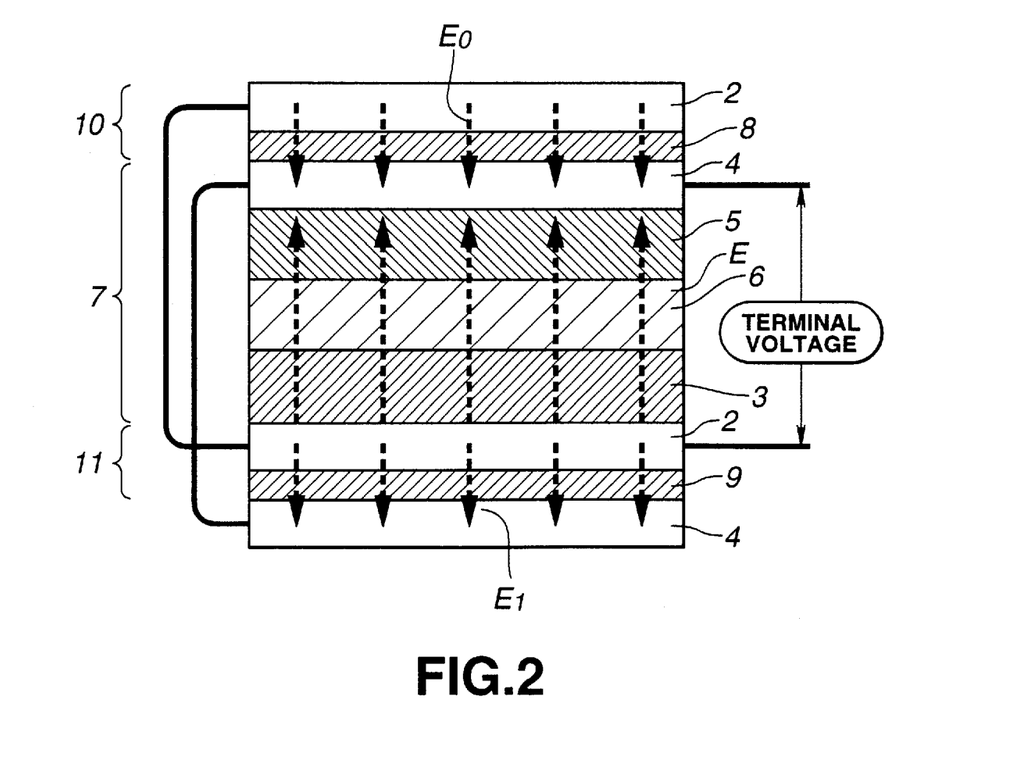
FIG. 2 is a cross sectional view showing an essential portion of the solid electrolyte battery according to the present invention.

An embodiment of the present invention will now be described with reference to the drawings. FIG. 1 is a perspective view showing a solid electrolyte battery according to the present invention. FIG. 2 is a cross sectional view showing an essential portion of the solid electrolyte battery according to the present invention.

A solid electrolyte battery 1 according to the present invention, as shown in FIG. 1, incorporates a rectangular parallelopiped battery structure portion 7. The battery structure portion 7 is constituted by a rectangular parallelopiped positive-electrode active-material layer 3 formed in a portion of the surface of an elongated positive-electrode collector 2. Moreover, the battery structure portion 7 is constituted by a rectangular parallelopiped negative-electrode active-material layer 5 formed in a portion of the surface of an elongated negative-electrode collector 4. The positive-electrode active-material layer 3 and the negative-electrode active-material layer 5 are formed opposite to each other through a rectangular parallelopiped polymer electrolyte layer 6. Thus, the rectangular parallelopiped battery structure portion 7 is constituted.

The solid electrolyte battery 1 incorporates a first charge-accumulating portion 10. The first charge-accumulating portion 10 is constituted by bending the positive-electrode collector 2 to surround the battery structure portion 7 through a dielectric-material layer 8. Thus, the positive-electrode collector 2 is, through the dielectric-material layer 8, formed opposite to a portion in which the negative-electrode active-material layer 5 of the negative-electrode collector 4 is formed. Moreover, the solid electrolyte battery 1 incorporates a second charge-accumulating portion 11. The second charge-accumulating portion 11 is constituted by bending the negative-electrode collector 4 to surround the battery structure portion 7 through a dielectric layer 9. Thus, the negative-electrode collector 4 is, through the dielectric-material layer 9, disposed opposite to a portion in which the positive-electrode active-material layer 3 of the positive-electrode collector 2 is formed.

The positive-electrode collector 2 is formed into an elongated shape constituted by metal foil, such as aluminum foil, nickel foil or stainless steel foil. Water and oil left on the surface of the positive-electrode collector 2 are completely and previously removed by organic solvent, such as N-methyl pyrolidone or acetone.

The positive-electrode collector 2 has a positive-electrode active-material layer 3 formed at an end 2a of the surface thereof. A residual portion except for the portion in which the positive-electrode active-material layer 3 has been formed is formed on a side surface of the battery structure portion 7 through the dielectric-material layer 8. Moreover, the positive-electrode collector 2 is disposed opposite to the surface on which the negative-electrode active-material layer 5 of the negative-electrode collector 4 is formed.

On the other hand, the negative-electrode collector 4 is formed into an elongated shape constituted by metal foil, such as copper foil, nickel foil or stainless steel foil. Water and oil left on the surface of the negative-electrode collector 4 are completely and previously removed by organic solvent, such as N-methyl pyrolidone or acetone. The negative-electrode collector 4 is previously subjected to an annealing process for 24 hours at 120° C. in an environment filled with inert gas.

The negative-electrode active-material layer 5 is formed on the surface of an end 4a of the surface of the negative-electrode collector 4. The portion of the positive-electrode collector 2 except for the portion in which the positive-electrode active-material layer 3 has been formed is disposed on the side surface of the battery structure portion 7 through the dielectric layer 9. Moreover, the positive-electrode collector 2 is, through the dielectric layer 9, disposed opposite to the surface of the positive-electrode collector 2 on which the positive-electrode active-material layer 3 is formed.

The positive-electrode active-material layer 3 is formed on the surface of the end 2a of the surface of the positive-electrode collector 2. The positive-electrode active-material layer 3 is mainly composed of a positive-electrode active material and a solid electrolyte.

As the positive-electrode active material for constituting the positive-electrode active-material layer 3, a known material, such as a metal oxide, a metal sulphide or a specific high polymer, may be employed to be adaptable to the type of a required battery.

When a battery incorporating lithium ions is manufactured, the positive-electrode active material for layer 3 may be metal sulphide, such as $TiS_2$, $MoS_2$, $NbSe_2$ or $V_2O_5$ or oxide. Also composite lithium oxide mainly composed of $Li_xMO_2$ (where M is one or more types of transition metal and x is value which varies depending on the state of charge and discharge of the battery and which is 0.05 or more and 1.10 or less) may be employed. It is preferable that the transition metal M for constituting the composite lithium oxide is Co, Ni or Mn. The composite lithium oxide is exemplified by $LiCoO_2$, $LiNiO_2$, $LiNi_yCo_{1-y}O_2$ (where 0<y<1) and $LiMn_2O_4$. The composite lithium oxide is the positive-electrode active material which is capable of generating high voltage and exhibiting a satisfactorily high energy density. Note that the negative-electrode collector 4 may be composed by combining a plurality of the abovementioned positive-electrode active materials. To form the negative-electrode collector 4 by using the above-mentioned positive-electrode active material, a known conductive material or a binder may be used.

The solid electrolyte for constituting the positive-electrode active-material layer 3 may be a gel material containing a swelling solvent (hereinafter a "gel electrolyte") or a high-polymer solid electrolyte. In particular, the gel electrolyte is able to improve a state of contact between the electrolyte and the active material. Moreover, the battery 1 is able to have flexibility.

The gel electrolyte contains the swelling solvent, which contains the electrolyte, and matrix high polymer. The swelling solvent may be ester, ether or carbonate. The foregoing material may be employed solely or as a component of a plasticizer. It is preferable that the content of the swelling solvent is 10 wt % or higher and 80 wt % or lower. If the content of the swelling solvent is higher than 80 wt %, satisfactory large mechanical strength cannot be realized in spite of a high ion conductivity. If the content of the swelling solvent is lower than 10 wt %, the ion conductivity is reduced in spite of large mechanical strength.

The electrolyte which is contained in the swelling solvent may be a usual electrolyte for use in an electrolyte solution for a battery. Specifically, any one of the following lithium salt may be employed: $LiPF_6$, $LiBF_4$, $LiAsF_6$, $LiClO_4$, $LiCF_3FO_3$, $LiN(SO_2CF_3)_2$, $LiC(SO_2CF_3)_3$, $LiAlCl_4$ and $LiSiF_6$. It is preferable that $LiPF_6$ or $LiBF_4$ is employed to realize stable oxidation. The concentration of the electrolyte with respect to the swelling solvent is not less than 0.1 mol/l nor more than 3.0 mol/l. It is preferable that the concentration is not less than 0.5 mol/l nor more than 2.0 mol/l.

The matrix high polymer for gelling the swelling solvent may be any one of a variety of high polymers for use to constitute the gel electrolyte. Specifically, any one of the following materials may be employed: fluorine high polymer, such as a copolymer of polyvinylidene fluoride or vinylidene fluoride and hexafluoropropylene; ether type high polymer, such as crosslinked polyethylene oxide or polyethylene oxide; methacrylate ester high polymer; acrylate high polymer; and polyacrylonitrile. Each of the foregoing materials may be employed solely or their mixture may be employed. When the fluorine high polymer material is employed, the stability of oxidation and reduction characteristic can be improved. It is preferable that the matrix high polymer is contained at not less than 10 wt % nor more than 50 wt % with respect to the gel electrolyte.

Additives may be added to the layer 3 solid electrolyte, if necessary. As the solid electrolyte according to the present invention, the following high-polymer solid electrolyte may be employed in place of the foregoing gel electrolyte.

The high-polymer solid electrolyte is composed of lithium salt and a high polymer compound for dissolving the lithium salt. The high polymer compound may be ether-type high polymer material, such as polyethylene oxide or crosslinked polyethylene oxide; polyester-type high polymer material, such as polymethacrylate; or polyacrylate. Each of the foregoing materials may solely be employed or their mixture may be employed. As the lithium salt, the above-mentioned lithium salt which is contained in the gel electrolyte may be employed.

The negative-electrode active-material layer 5 is formed on the surface of the end 4a of the negative-electrode collector 4. The negative-electrode active-material layer 5 is mainly composed of a negative-electrode active material and the solid electrolyte.

When a lithium ion battery is manufactured, it is preferable that the negative-electrode active material for constituting the negative-electrode active-material layer 5 is a material which permits doping/dedoping lithium. The material which permits doping/dedoping lithium is exemplified by a non-graphityzing carbon material and a graphite-type carbon material.

The carbon material is exemplified by a carbon material, such as pyrocarbon, cokes, graphite, vitreous carbon fibers, a calcinated material of organic high polymer compound, carbon fibers and active carbon. The cokes are, for example, pitch cokes, needle cokes or petroleum cokes. The calcinated material of the organic high polymer compound is a material obtained by calcinating phenol resin or furan resin at an appropriate temperature to carbonize the foregoing resin.

As an alternative to the foregoing carbon material, a material which permits doping/dedoping lithium is exemplified by a high polymer material, such as polyacetylene or polypyrrole or oxide such as $SnO_2$.

The solid electrolyte for constituting the negative-electrode active-material layer 5 may be a material similar to the solid electrolyte for constituting the positive-electrode active-material layer 3.

The positive-electrode active-material layer 3 and the negative-electrode active-material layer 5 constituted as described above are formed opposite to each other so as to be bonded to each other through the polymer electrolyte layer 6. The polymer electrolyte layer 6 is, for example, the solid electrolyte for constituting the positive-electrode active-material layer 3 and the negative-electrode active-material layer 5.

The dielectric-material layer 8 is formed on the side surface of the battery structure portion 7 and between the negative-electrode collector 4 disposed above the negative-electrode active-material layer 5 and the positive-electrode collector 2. That is, the dielectric-material layer 8 surrounds the one side surface and one main surface of the battery structure portion 7. The dielectric layer 9 is formed on the one side surface of the battery structure portion 7 and between the positive-electrode collector 2 disposed on the positive-electrode active-material layer 3 and the negative-electrode collector 4. That is, the dielectric layer 9 surrounds the one side surface and one main surface of the battery structure portion 7.

The dielectric-material layers 8 and 9 are formed into layered structures made of ferroelectric material. For example, barium titanate, lead zirconate titanate (PZT) or polyvinylidene fluoride (PVdF) is formed into a layer having a required thickness by thermal melting method.

The dielectric-material layers 8 and 9 are formed along the reverse sides of the corresponding collectors 2 and 4. Then, a heat laminating apparatus is operated so that the dielectric-material layers 8 and 9 are completely bonded to each other. At this time, direct contact between the positive-electrode active-material layer 3 and the negative-electrode collector 4 and between the negative-electrode active-material layer 5 and the positive-electrode collector 2 must, of course, be prevented. Moreover, the dielectric-material layers 8 and 9 are formed between the collectors 2 and 4 to prevent direct contact between the positive-electrode collectors 2 and 4. The dielectric-material layers 8 and 9 as well as serve as insulating materials.

A positive-electrode lead terminal 12 is welded to the portion 2b in which the metal surface of the positive-electrode collector 2 is exposed to the outside. A negative-electrode lead terminal 13 is welded to the portion 4b in which the metal surface of the negative-electrode collector 4 is exposed to the outside. The lead terminals 12 and 13 serve as external terminals.

Figure 3:
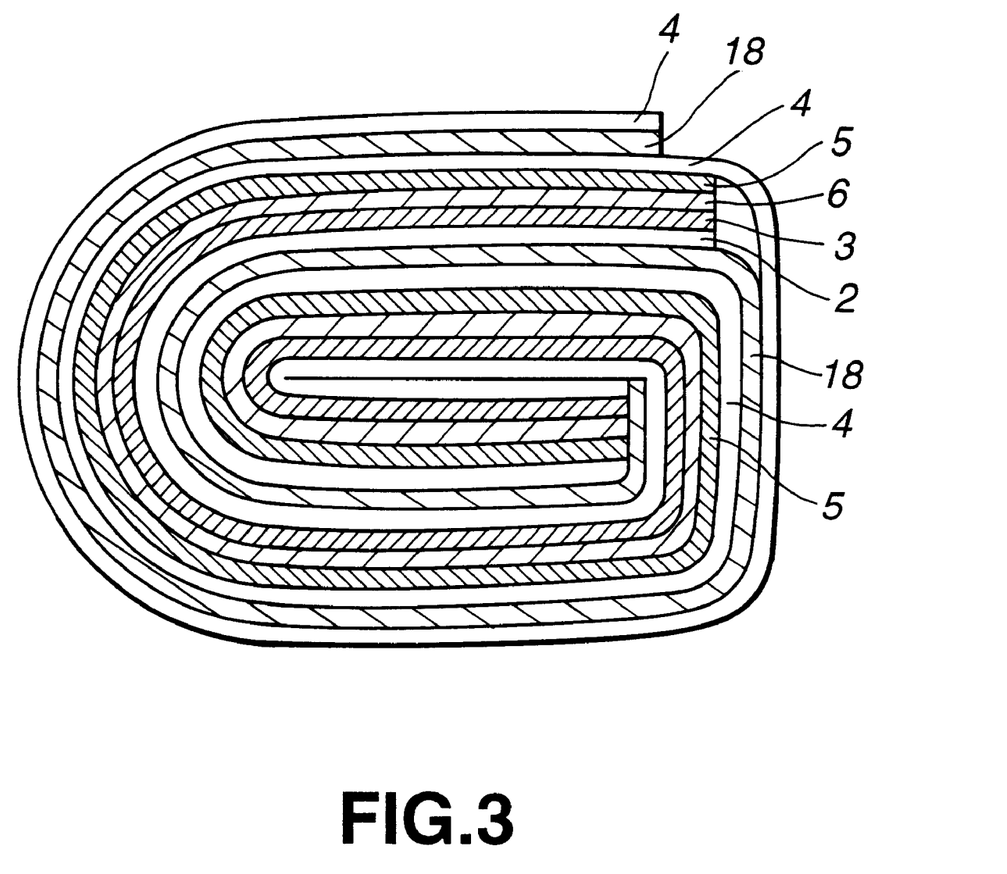
FIG. 3 is a cross sectional view showing another example of the solid electrolyte battery according to the present invention.

The solid electrolyte battery according to the present invention is not limited to the thin-type battery as shown in FIGS. 1 and 2. For example, the present invention may be applied to a cylindrical battery structure as shown in FIG. 3 such that the positive-electrode collector 2 and the negative-electrode collector 4 are spirally wound through the dielectric layers 8 and 9. At this time, one continuous charge accumulating portion is formed by integrating the first charge-accumulating portion 10 and the second charge-accumulating portion 11. The cylindrical solid electrolyte battery shown in FIG. 3 has one dielectric layer 18 in place of the dielectric layers 8 and 9.

Figure 4:
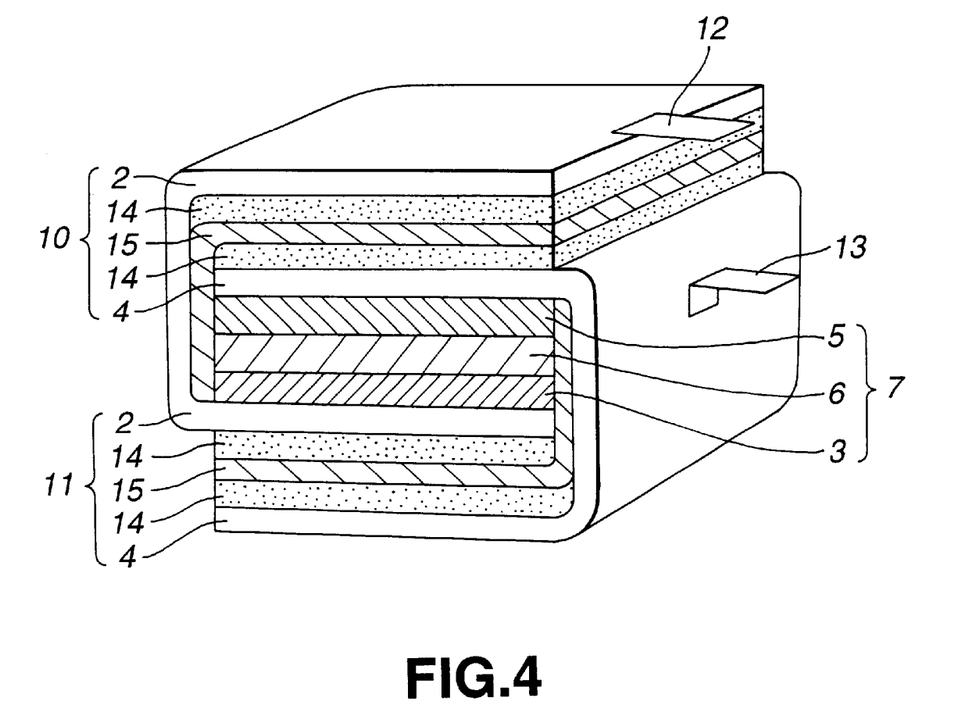
FIG. 4 is a cross sectional view showing another example of the solid electrolyte battery according to the present invention.

The solid electrolyte battery according to the present invention may have a double electric layer formed in place of the dielectric layers 8 and 9 formed in the corresponding first and second charge accumulating portions 10 and 11. Specifically, as shown in FIG. 4, active carbon layers 14 are provided for the opposite surfaces of the positive-electrode collector 2 and the negative-electrode collector 4 which constitute the first and second charge-accumulating portions 10 and 11. Moreover, a polymer electrolyte 15 is disposed between the active carbon layers 14. Thus, charges can furthermore effectively be accumulated in each of the charge accumulating portions 10 and 11.

Figure 5:
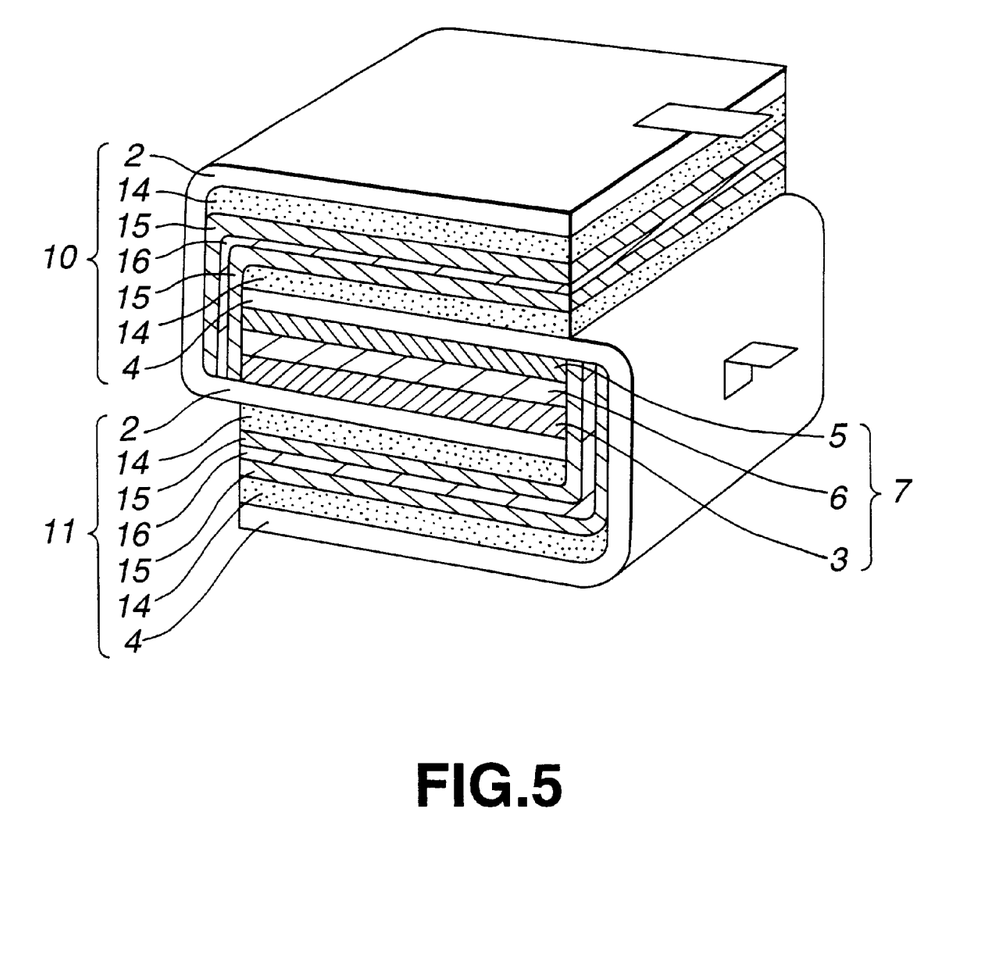
FIG. 5 is a cross sectional view showing another example of the solid electrolyte battery according to the present invention.

If the strength of the polymer electrolyte 15 is too weak, it is preferable that an ion-penetration separator 16 is disposed in the polymer electrolyte 15, as shown in FIG. 5. Thus, a polymer electrolyte 15 having a double-layer structure into which non-proton solution has been injected is formed. The reason for this lies in that, for example, occurrence of a short circuit owning to the poor strength of the polymer electrolyte 15 must be prevented.

Figure 6:
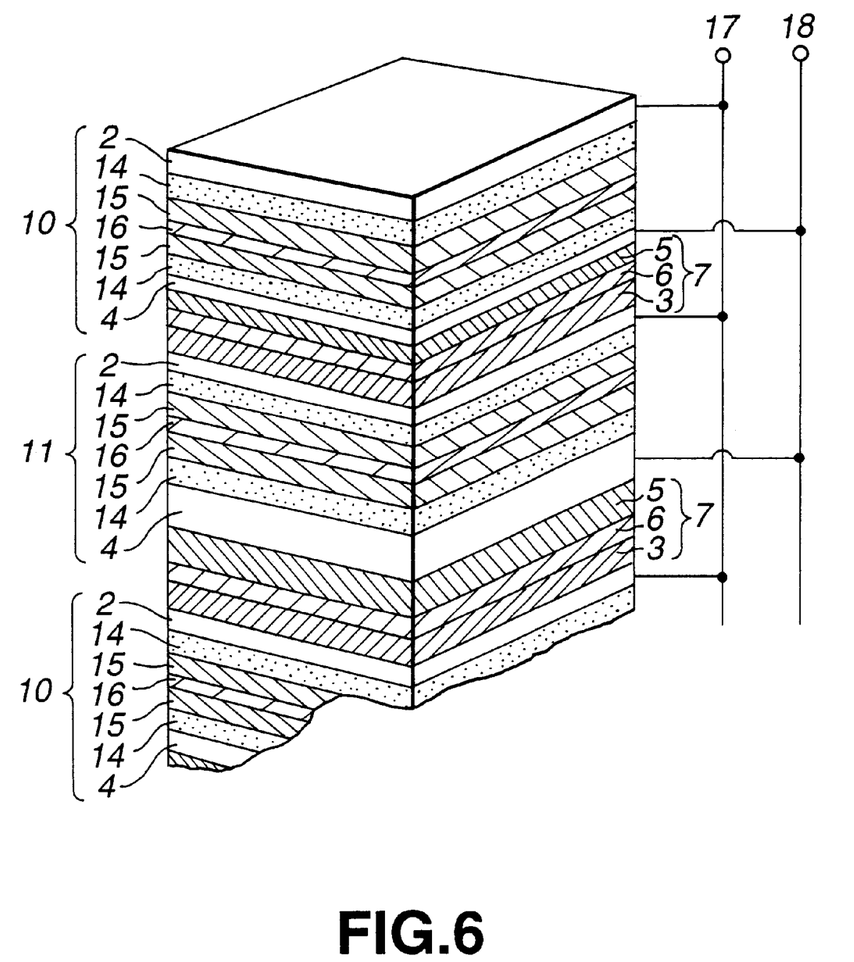
FIG. 6 is a perspective view showing another example of the solid electrolyte battery according to the present invention.

As shown in FIG. 6, the solid electrolyte battery according to the present invention may be structured such that the battery structure portion 7 and the charge accumulating portions 10 and 11 having the structures shown in FIG. 5 are stacked to form a flat structure. In the foregoing case, the capacitance can furthermore easily be enlarged. A flat solid electrolyte battery shown in FIG. 6 must have a positive-electrode wire 17 for connecting a plurality of the positive-electrode collectors 2 to one another and a negative electrode wire 18 for connecting a plurality of negative-electrode collectors 4 to one another.

With the solid electrolyte battery 1 according to the present invention and structured as described above, charge and discharge are performed as follows: In the solid electrolyte battery 1, electrochemical reactions are performed in a manner which is basically the same as those which are performed in a lithium ion battery which is a non-aqueous electrolyte secondary battery.

The charging reactions for the solid electrolyte battery 1 will now be described. Initially, the charging operation is started by applying the terminal voltage. Thus, lithium ions are ejected from the positive-electrode active-material layer 3. Thus, the lithium ions moved to the negative electrode, specifically to the negative-electrode active-material layer 5 owning to the electrolyte in the gel-form polymer electrolyte layer 6 which has cation conductivity. The lithium ions moved to the negative-electrode active-material layer 5 are doped by the negative-electrode active material so that the lithium ions receive electrons. Thus, the charging reactions are performed.

The discharging reactions in the solid electrolyte battery 1 will now be described. Lithium ions in the negative-electrode active-material layer 5 are caused to react in an inverse manner to the foregoing charging reactions. That is, lithium ions ejected from the negative-electrode active-material layer 5 are moved to the positive electrode, specifically, to the positive-electrode active-material layer 3 by the electrolyte in the gel-form polymer electrolyte layer 6. Thus, the lithium ions receive electrons.

When the discharge is performed with the solid electrolyte battery 1 according to the present invention, charges have been accumulated in the charge accumulating portions 10 and 11. The positive and negative charges which have been accumulated cause electric fields $E_0$ and $E_1$ to exist in the charge accumulating portions 10 and 11. On the other hand, electric field E exists in the battery structure portion 7.

The electric field E which acts on the battery structure portion 7 depends on the relative dielectric constant and thickness of each of the dielectric layers 8 and 9 of the charge accumulating portions 10 and 11. When the double electric layer of FIG. 5 is employed as an alternative to the dielectric layers 8 and 9, the electric field E depends on the materials and the electrolyte solution contained in the double electric layer or the properties of the gel electrolyte disposed in the double structure of the double electric layer. As a result, the voltage of the battery structure portion 7 is determined by the foregoing electric field E. The potential which acts on the battery structure portion 7 varies by the thickness of the battery structure portion 7 and the amounts of charges accumulated in the charge accumulating portions 10 and 11.

When ions are moved in the battery structure portion of a conventional gel electrolyte battery containing the gel electrolyte, the ion atmosphere at the position from which the ions have been moved disappears. An ion atmosphere is generated at a new position to which ions have been moved. The foregoing reorganization is not quickly performed. That is, a certain time delay occurs. The foregoing phenomenon is called relaxation. As a result, an ion atmosphere is created in which ions density is low in a direction in which the central ion moves. On the other hand, the density of ions is high in the direction opposite to the movement direction for the central ion. Thus, an asymmetric ion atmosphere is formed. The foregoing ion atmosphere has charges, the sign of which is opposite to that of the central ion. Therefore, the charges are positioned in the rear of the moving ions. As a result, the foregoing charges obstructs the movement of the ions by the mutual electrostatic action. Thus, the moving speed of the ions are reduced.

Moreover, the ion atmosphere containing the charges which have the opposite signs moves in a direction of a mesial magnitude a of the ion. Therefore, the original moving speed of the ions are furthermore reduced. The foregoing phenomenon is called an electrophoresis effect.

When ions are moved in the gel electrolyte, the ions must pass through the high polymer network generally having polar molecule chains. When ions are moved in high polymers having a small dielectric action, resistance in proportion to the index of the moving speed is produced. Therefore, the resistance reduces the moving speed of the ions.

As a result, the conventional solid electrolyte battery, in particular, the gel electrolyte battery has been considered that it has an unsatisfactory discharging characteristic with respect to a large electric current.

In the solid electrolyte battery 1 according to the present invention, the charges accumulated in the charge accumulating portions 10 and 11 impart the electric field E to the ion atmosphere. The electric field E causes the ion atmosphere in the polymers in the battery structure portion 7 to easily be moved in the same direction as the direction of movement of the lithium ions which occurs when the discharge is performed. Therefore, the lithium ions are permitted to move while resistance exerted from the solvated solution and that exerted in small regions of the gel polymers are being moderated. As a result, the movement of the lithium ions can be enhanced. Therefore, the solid electrolyte battery 1 according to the present invention has an excellent load characteristic against discharge of a large electric current as compared with the conventional solid electrolyte battery which is not provided with the charge accumulating portions 10 and 11.

That is, the solid electrolyte battery 1 according to the present invention is structured such that sufficiently large charges have been stored in the charge accumulating portions 10 and 11. Therefore, discharge from the charge accumulating portions 10 and 11 is able to cope with an instantaneous load of a large electric current.

Charges are sufficiently accumulated in the first and second charge accumulating portions 10 and 11 of the solid electrolyte battery 1 according to the present invention. The charges have a function to always supplement the amount of charges which are discharged to the outside through the terminals 12 and 13. Therefore, if instantaneous discharge of a large electric current, that is, pulse-shape loads successively take place, the accumulation of loads can quickly be recovered in a short time in which the discharge is not performed. As a result, the solid electrolyte battery 1 has the pulse load characteristic superior to that of the conventional battery having no charge accumulating portion.

Therefore, the solid electrolyte battery 1 according to the present invention incorporating the charge accumulating portions 10 and 11 is a battery having a great capacitance. Thus, the load characteristic against the pulse discharge can significantly be improved. Moreover, existence of the electric field E which is generated by the charge accumulating portions 10 and 11 and which penetrates the battery structure portion 7 improves the load characteristic. As a result, deterioration in the load at low temperatures which has been considered to be disadvantage of the polymer battery can be compensated and improved.

EXAMPLES

Results of experiments of examples of the present invention will now be described. To evaluate the discharge load characteristic (a heavy load characteristic) and the load characteristic against pulse discharge of the solid electrolyte battery according to the present invention, a solid electrolyte battery was manufactured as follows.

Example 1

Initially, elongated aluminum foil containing aluminum at a purity of 99.97% or higher was used to manufacture a positive-electrode collector 2 having a thickness of 20 $\mu$m. Water and oil left on the surface of the aluminum foil were previously and completely removed by N-methyl pyrolidone (organic solvent).

Then, a positive-electrode active-material layer 3 was formed on an end 2a of the surface of the positive-electrode collector 2. In the positive-electrode active-material layer 3, particles of positive-electrode active material, such as $LiCoO_2$, are bound to each other in the form of a sponge-like configuration while appropriate voids being maintained such that PVdF (polyvinylidene fluoride) serves as a binder. Moreover, the voids are completely filled with a gel polymer electrolyte. The gel polymer electrolyte was prepared by using a copolymer, the base of which was polyvinylidene fluoride, and which was mixed with ethylene carbonate and propylene carbonate at a weight ratio of 1:1. Moreover, lithium salt of $LiPF_6$ was dissolved so that the gel polymer electrolyte was prepared.

Moreover, elongated copper foil containing copper at a purity of 99.98% or higher was used to manufacture a negative-electrode collector 4 having a thickness of 15 $\mu$m. Water and oil left on the surface of the copper foil were previously and completely removed by N-methyl pyrolidone (the organic solvent). Then, the negative-electrode collector 4 was annealed at 120° C. for 24 hours in an atmosphere filled with inert gas.

Then, a negative-electrode active-material layer 5 was formed on an end 4a of the negative-electrode collector 4. The negative-electrode active-material layer 5 contained particles of an active material composed of graphite. The particles were bound to one another in the form of a sponge-like configuration while appropriate voids being maintained such that PVdF served as a binder. Moreover, the voids were completely filled with the gel polymer electrolyte. The gel polymer electrolyte was prepared similar to the method for preparing the gel polymer electrolyte contained in the positive-electrode active-material layer 3.

Then, the gel polymer electrolyte contained in the positive-electrode active-material layer 3 and the negative-electrode active-material layer 5 was used to manufacture a polymer electrolyte layer 6 having a thickness of about 100 $\mu$m.

Then, the positive-electrode active-material layer 3 and the negative-electrode active-material layer 5 were formed opposite to each other through the polymer electrolyte layer 6 and bonded to each other. Thus, a battery structure portion 7 was manufactured.

Then, a portion of the positive-electrode collector 2 in which the positive-electrode active-material layer 3 was not formed was bent to surround the battery structure portion 7 through a dielectric-material layer 8 constituted by lead zirconate titanate (PZT) or polyvinylidene fluoride (PVdF). Then, a portion of the positive-electrode collector 2 in which the positive-electrode active-material layer 3 was not formed was disposed opposite to the surface of the negative-electrode collector 4 in which the negative-electrode active-material layer 5 was formed through the dielectric-material layer 8.

Similarly, a portion of the negative-electrode collector 4 in which the negative-electrode active-material layer 5 was not formed was bent to surround the battery structure portion 7 through a dielectric layer 9 composed of PZT and PVdF. A portion of the negative-electrode collector 4, in which the negative-electrode active-material layer 5 was not formed, was, through the dielectric layer 9, disposed opposite to the surface of the positive-electrode collector 2 in which the positive-electrode active-material layer 3 was formed.

At this time, the portions in which the dielectric layers 8 and 9 were provided for the positive-electrode collector 2 and the negative-electrode collector 4 were disposed to reach the reverse side of each of the collectors 2 and 4.

The positive-electrode collector 2, the negative-electrode collector 4 and the dielectric layers 8 and 9 were disposed as described above. Then, a heat laminating apparatus was operated to completely bond the foregoing elements. Thus, the solid electrolyte battery 1 was manufactured.

Comparative Example

A positive-electrode collector, a positive-electrode active material layer, a polymer-electrolyte layer and a negative-electrode collector were laminated in this order. Thus, a conventional solid electrolyte battery having no charge accumulating portion was manufactured.

<Evaluation of Discharge Load Characteristic>

The discharge load characteristic and the load characteristic against pulse discharge of the thus-manufactured solid electrolyte batteries according to each of the example and the comparative example were evaluated.

To evaluate the discharge load characteristic and the load characteristic against the pulse discharge, a plurality of the batteries according to the example and the comparative example, respectively, were manufactured.

Initially, each of the manufactured batteries according to the example and the comparative example was charged under conditions that the charging voltage was 4.2 V, the charging current was 200 mA and the charging duration was 8 hours. Then, discharge was performed under the conditions that the discharging current was 300 mA and the final voltage was 30 V. Thus, capacitances at the time of the discharge were obtained. The discharge capacitances were used as a standard discharge capacitance for each of the example and the comparative example.

Then, the discharging electric current was changed as 500 mA, 1 A and 1.5 A so that the discharge capacitance of each of the manufactured example and the comparative example was measured.

Figure 7:
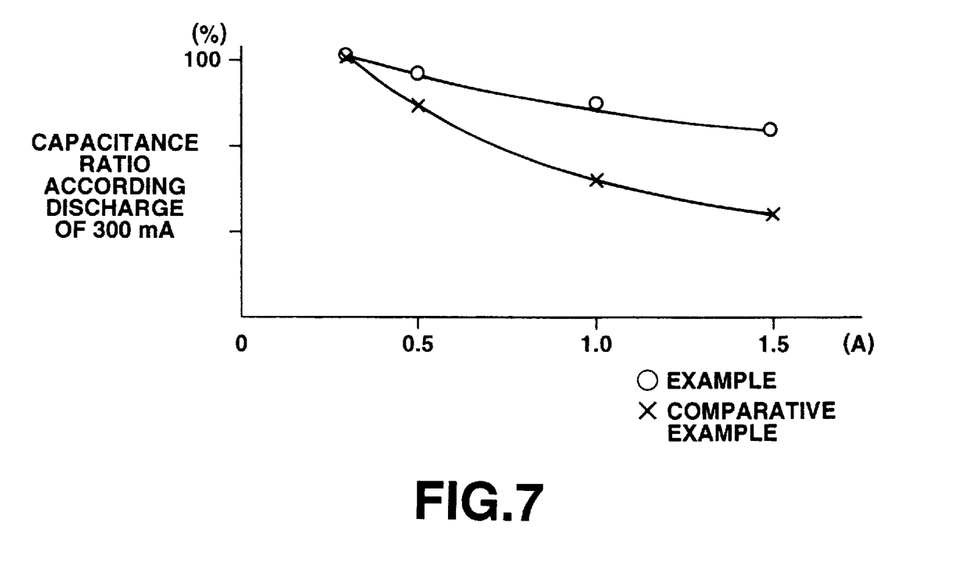
FIG. 7 is a graph showing results of experiments of discharge load characteristics of the batteries according to an example and a comparative example.

Then, values each of which was obtained by standardizing the measured discharge capacitance with the standard discharge capacitance, that is, values (%) each of which was obtained by dividing the measured discharge capacitance with the standard discharge capacitance were obtained. Results were shown in FIG. 7. In FIG. 7, the axis of abscissa stood for discharging currents and axis of ordinate stood for the values obtained by standardizing the measured discharge capacitance with the standard discharge capacitance.

As can be understood from the results shown in FIG. 7, the solid electrolyte battery according to the present invention and provided with the charge accumulating portion has a significantly excellent load characteristic as compared with the solid electrolyte battery according to the comparative example and provided with no charge accumulating portion.

<Evaluation of Load Characteristic Against Pulse Discharge>

Initially, the manufactured batteries according to the example and the comparative example were charged under the conditions that the charging voltage was 4.2 V, the charging current was 200 mA and the charging duration was 8 hours. Then, the pulse discharging conditions was 1 A for 2.3 msec in a 20° C. atmosphere. Moreover, the condition was 160 mA for 2.3 msec. Thus, the capacitance at the time of the discharge was measured.

Figure 8:
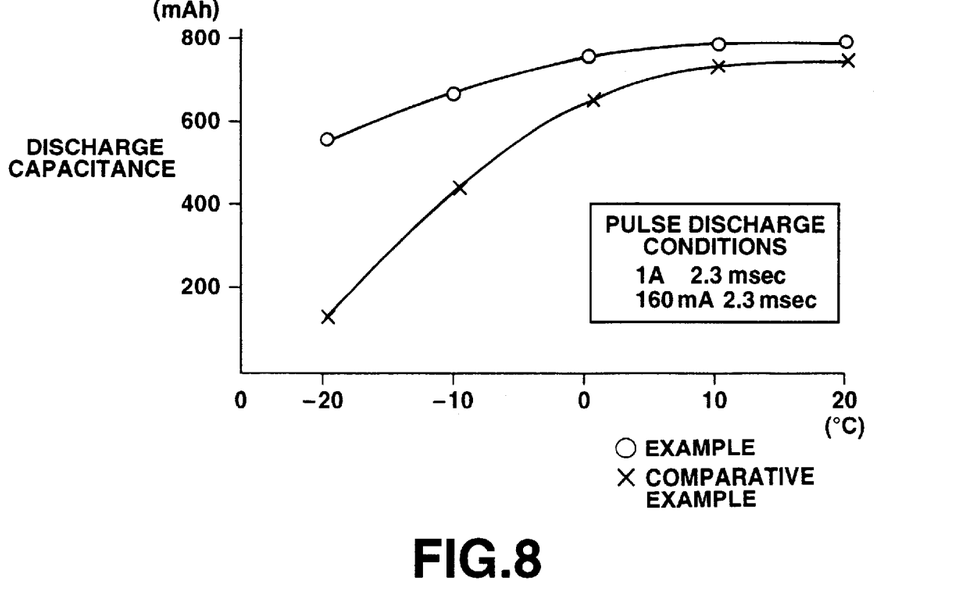
FIG. 8 is a graph showing results of experiments of pulse discharge characteristics of the batteries according to an example and a comparative example.

Then, the atmosphere temperature was varied to −20° C., −10° C., 0° C. and 10° C. to measure the capacitance at the time of the discharge in each atmosphere. Results were shown in FIG. 8. In FIG. 8, the axis of abscissa stood for atmosphere temperatures and the axis of ordinate stood for the measured discharge capacitance.

As can be understood from the results shown in FIG. 8, the solid electrolyte battery according to the present invention and provided with the charge accumulating portion had excellent load characteristic against the pulse discharge as compared with the solid electrolyte battery according to the comparative example and provided with no charge accumulating portion regardless of the atmosphere temperature. In a low temperature atmosphere when the temperature was −20° C. or −10° C., a fact was found that the solid electrolyte battery according to the present invention had the excellent load characteristic against the pulse discharge. Therefore, the solid electrolyte battery according to the present invention was able to significantly improve the problem of deterioration in the ion conductivity at low temperatures which has been the problem for the conventional technique.

As described above, the solid electrolyte battery according to the present invention having the charge accumulating portion is a battery having a great capacitance. Therefore, the load characteristic against the pulse discharge can significantly be improved. Moreover, the electric field is generated by the charge accumulating portion to penetrate the battery structure portion. Therefore, the ion conductivity can satisfactorily be improved, causing the load characteristic against discharge of a large electric current to be improved. The solid electrolyte battery according to the present invention is able to improve deterioration in the load characteristic at low temperatures, which was one problem for the polymer battery.

As a result, the solid electrolyte battery according to the present invention may be applied to power sources for portable apparatuses, such as the portable telephones, which perform the pulse discharge, and industrial power sources for apparatuses, such as automobiles, which instantaneously require a great electric current.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A solid electrolyte battery comprising:
   a battery structure portion constituted by forming a positive-electrode active-material layer in a portion of the surface of a positive-electrode collector and a negative-electrode active-material layer in a portion of the surface of a negative-electrode collector to be opposite to each other through a polymer electrolyte;
   a first charge-accumulating portion constituted by disposing, through a separating layer, said positive-electrode collector to be opposite to a portion of said negative-electrode collector in which said negative-electrode active-material layer is formed; and
   a second charge-accumulating portion constituted by disposing, through a separating layer, said negative-electrode collector to be opposite to a portion of said positive-electrode collector in which said positive-electrode active-material layer is formed.

2. A solid electrolyte battery according to claim 1, wherein
   said first charge-accumulating portion is constituted by bending said positive-electrode collector to surround said battery structure portion through said separating layer so as to be disposed opposite to the portion of said negative-electrode collector in which said negative-electrode active-material layer is formed, and
   said second charge-accumulating portion is constituted by bending said negative-electrode collector to surround said battery structure portion trough said separating layer so as to be disposed opposite to the portion of said positive-electrode collector in which said positive-electrode active-material layer is formed.

3. A solid electrolyte battery according to claim 1, wherein said separating layer is a dielectric layer.

4. A solid electrolyte battery according to claim 1, wherein said polymer electrolyte is a gel electrolyte.

5. A solid electrolyte battery according to claim 4, wherein said gel electrolyte contains swelling solvent, which contains an electrolyte, and matrix high polymers.

6. A solid electrolyte battery according to claim 5, wherein at least one type of said swelling solvent is selected from a group consisting of ester, ether and carbonate.

7. A solid electrolyte battery according to claim 5, wherein said electrolyte is selected from a group consisting of $LiPF_6$, $LiBF_4$, $LiAsF_6$, $LiClO_4$, $LiCF_3FO_3$, $LiN(So_2CF_3)_2$, $LiC(SO_2CF_3)_3$, $LiAlCl_4$ and $LiSiF_6$.

8. A solid electrolyte battery according to claim 5, wherein the content of said swelling solvent in said gell electrolyte is not less than 10 wt % nor more than 80 wt %.

9. A solid electrolyte battery according to claim 7, wherein the concentration of said electrolyte is not less than 0.1 mol/l nor more than 3.0 mol/l.

10. A solid electrolyte battery according to claim 1, wherein said positive-electrode collector is selected from aluminum foil, nickel foil and stainless steel foil.

11. A solid electrolyte battery according to claim 1, wherein said negative-electrode collector is selected from copper foil, nickel foil and stainless steel foil.

12. A solid electrolyte battery according to claim 1, wherein said separating layers each of which is formed in said first and second charge-accumulating portions are double electric layers, and said double electric layers have double-layer structures formed through a polymer electrolyte.

13. A solid electrolyte battery according to claim 5, wherein each of said double electric layers has a double-layer structure in which ion-penetration separator has been disposed in said polymer electrolyte and non-proton solution has been injected.

14. A solid electrolyte battery according to claim 1, wherein said positive-electrode collector and said negative-electrode collector are wound spirally through said separating layer and said first and second charge-accumulating portions are integrated so that one charge accumulating portion is formed.

15. A solid electrolyte battery, comprising:

a battery structure portion having a battery structure portion polymer electrolyte disposed between a positive-electrode active-material layer and a negative-electrode active-material layer;

a first charge-accumulating portion having a first dielectric layer disposed between a positive-electrode collector and a negative-electrode collector, wherein the negative-electrode collector is disposed against the negative-electrode active-material layer; and a second charge-accumulating portion having a second dielectric layer disposed between the negative-electrode collector and the positive-electrode collector, wherein the positive-electrode collector is disposed against the positive-electrode active-material layer, wherein the first dielectric layer includes a first polymer electrolyte disposed between a first active carbon layer and a second active carbon layer.

16. The solid electrolyte battery of claim 15, wherein the second dielectric layer includes a second polymer electrolyte disposed between a third active carbon layer and a fourth active carbon layer.

17. The solid electrolyte battery of claim 15, wherein the first polymer electrolyte includes a first portion that is separated from a second portion by an ion-penetration separator.

18. The solid electrolyte battery of claim 17, wherein the first polymer electrolyte includes a non-proton solution.

19. The solid electrolyte battery of claim 17, wherein the polymer electrolyte is a gel electrolyte.

20. The solid electrolyte battery of claim 17, wherein the positive-electrode collector and the negative-electrode collector are wound spirally through the separating layer and the first and second charge-accumulating portions are integrated so that one charge accumulating portion is formed.

* * * * *